US009316838B2

(12) United States Patent
Chien

(10) Patent No.: US 9,316,838 B2
(45) Date of Patent: Apr. 19, 2016

(54) LED DEVICE HAS CHANGEABLE IMAGE

(76) Inventor: Tseng-Lu Chien, Walnut, CA (US)

( * ) Notice: Subject to any disclaimer, the term of this patent is extended or adjusted under 35 U.S.C. 154(b) by 595 days.

(21) Appl. No.: 13/021,124

(22) Filed: Feb. 4, 2011

(65) Prior Publication Data

US 2012/0200828 A1   Aug. 9, 2012

(51) Int. Cl.
 *G02B 27/08* (2006.01)
 *A63H 33/22* (2006.01)
(52) U.S. Cl.
 CPC .............. *G02B 27/08* (2013.01); *A63H 33/22* (2013.01)
(58) Field of Classification Search
 CPC .............................. G02B 27/08; A63H 33/22
 USPC .............. 353/1, 28, 29, 30, 31, 32, 119, 99; 359/32, 33, 35, 197, 227, 616, 617, 359/663; 250/208.1, 202, 204, 205, 550, 250/559.05, 559.14; 315/185 S
 See application file for complete search history.

(56) References Cited

U.S. PATENT DOCUMENTS

| 2,604,812 | A | * | 7/1952 | Des Moineaux | 353/1 |
| 5,184,249 | A | * | 2/1993 | Dickman | 359/616 |
| 7,589,825 | B2 | * | 9/2009 | Orchard et al. | 356/4.03 |
| 8,157,380 | B2 | * | 4/2012 | Peffer et al. | 353/1 |

* cited by examiner

*Primary Examiner* — Georgia Y Epps
*Assistant Examiner* — Don Williams
(74) *Attorney, Agent, or Firm* — Bacon & Thomas, PLLC

(57) ABSTRACT

An LED device having a changeable image includes an LED light source, a kaleidoscope with a variety of constructions through which light from the LED light source is transmitted to form a kaleidoscopic image, an image changing mechanism or device for changing the position, orientation, and/or relationships of an inner-medium or media in the kaleidoscope to change the kaleidoscopic image, and a projection assembly for projecting the kaleidoscopic image to a surface such as a wall, ceiling, floor, or surface of an object.

4 Claims, 3 Drawing Sheets

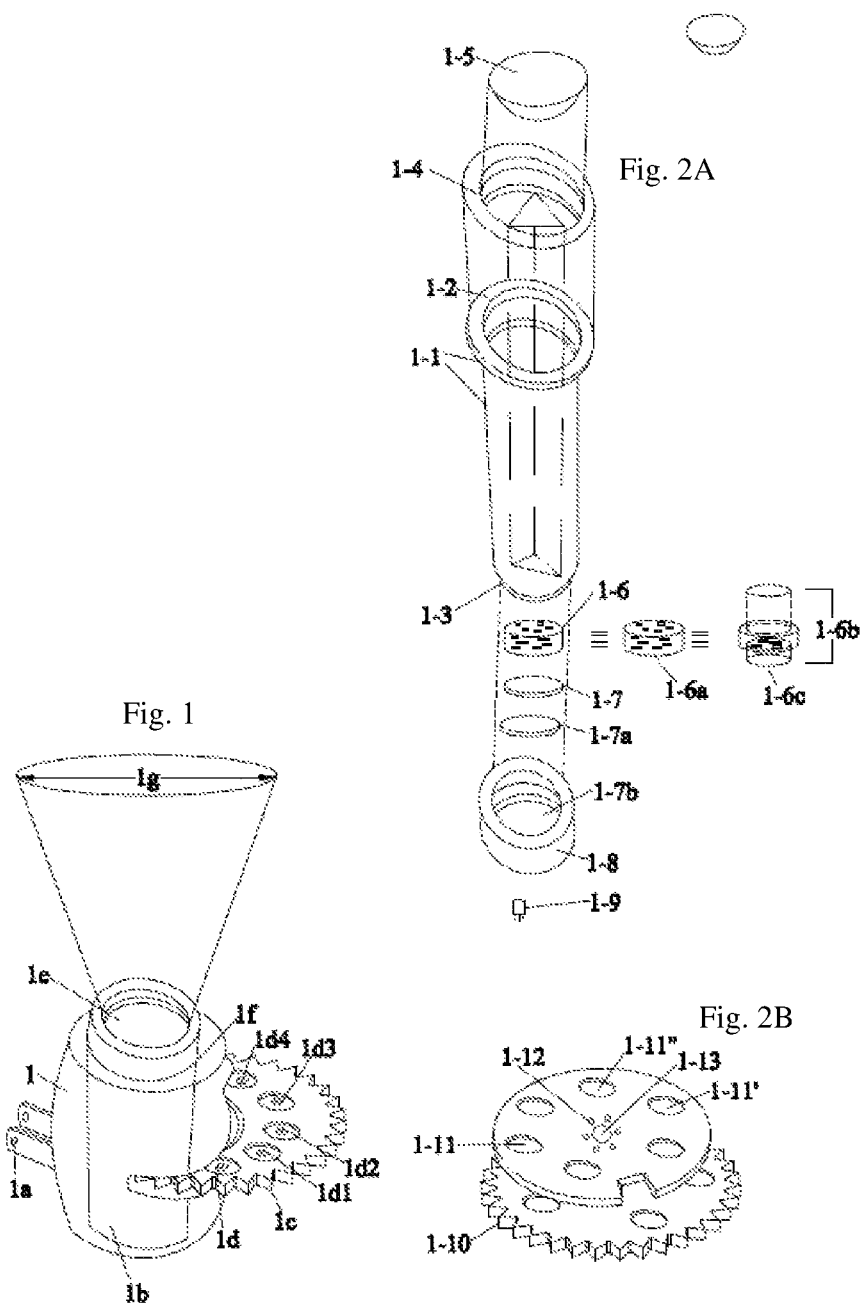

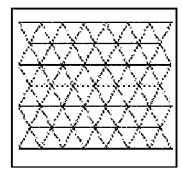
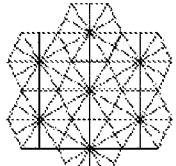
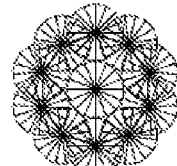
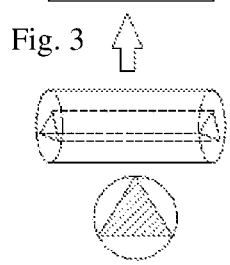
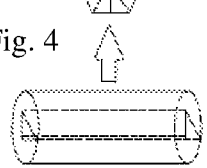
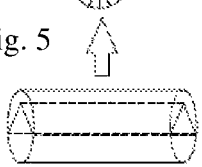
Fig. 3     Fig. 4     Fig. 5
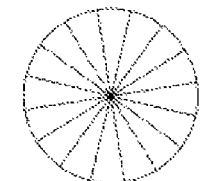
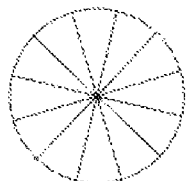
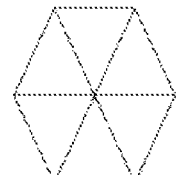
Fig. 6     Fig. 7     Fig. 8
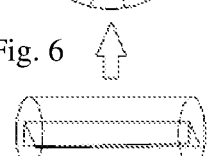
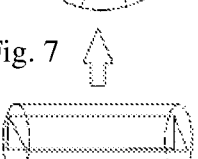
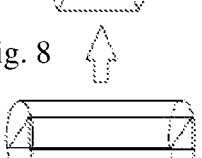
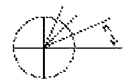
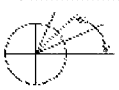
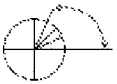
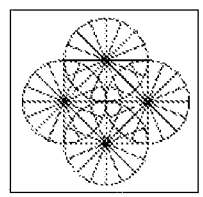
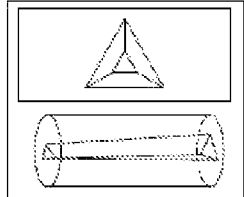
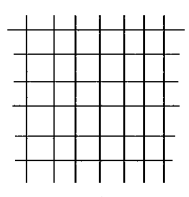
Fig. 9     Fig. 10     Fig. 11
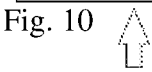
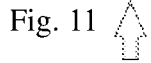

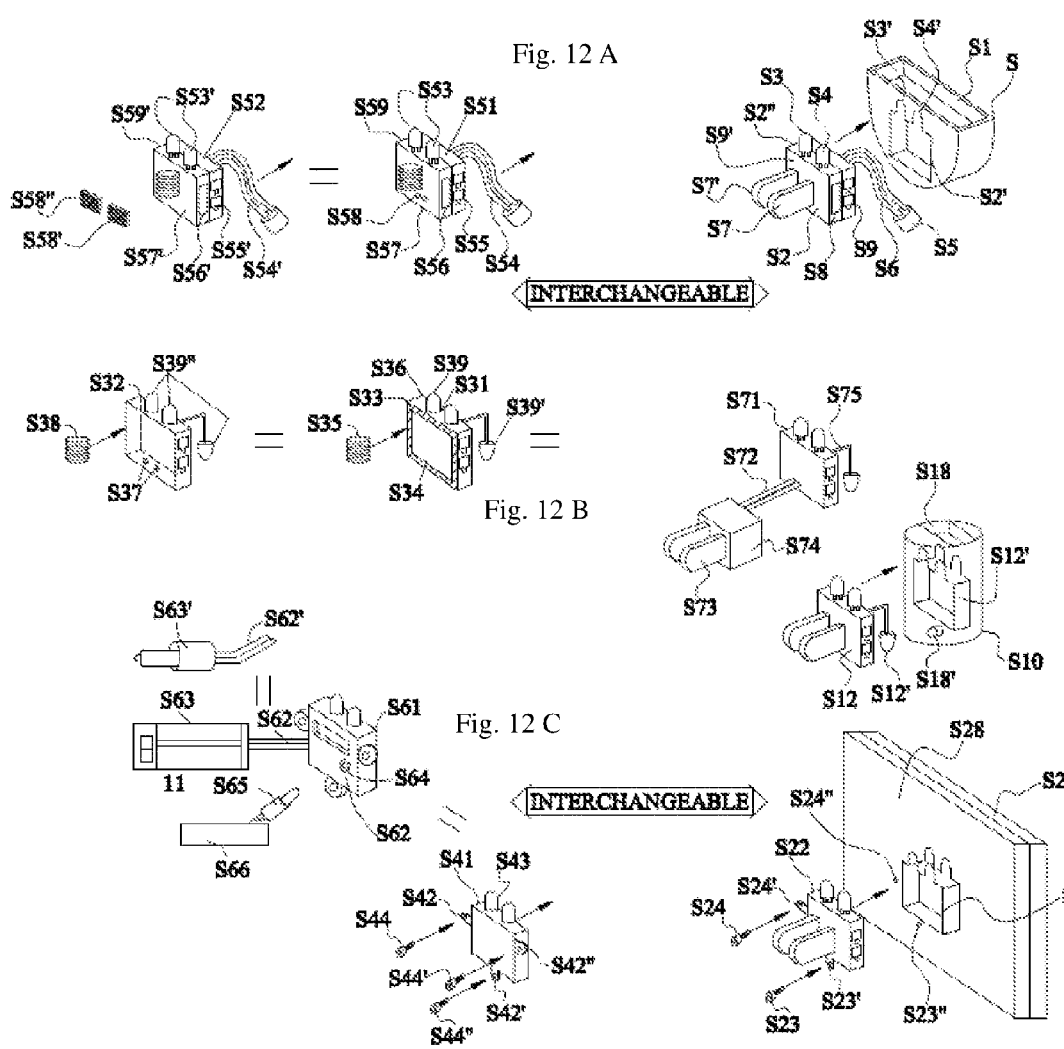

LED DEVICE HAS CHANGEABLE IMAGE

BACKGROUND OF THE INVENTION

This application has subject matter in common with the inventor's copending U.S. patent application Ser. Nos. 12/948,953, 12/938,564, 12/886,832, 12/876,507, 12/771,003, 12/624,621, 12/914,584, 12/318,471, 12/318,470, and 12/834,435, and the inventor's issued U.S. patent application Ser. No. 12/292,153 (now is U.S. Pat. No. 7,871,192), Ser. No. 12/232,505 (now is U.S. Pat. No. 7,832,917), and Ser. No. 12/318,473 (now is U.S. Pat. No. 7,832,918).

The current invention an LED device having a changeable image which incorporates (1) a traditional kaleidoscope-means with a variety of constructions, (2) the LED light device, (3) changing-means to change the position, orientation, and/or relationships of an inner-medium or media, (4) control means to control the changing-means, light functions, brightness, color, and light effects, (5) a projection assembly with optics-means and other parts and accessories, (6) a power source to enable the LED device with kaleidoscope means to offer illumination for a desired number of hours.

The conventional kaleidoscope for kids has been used since 1816 in England and became a popular item in 19th century China and worldwide. The kaleidoscope has many different constructions and performance depends on market requirement. The preferred kaleidoscope parts and accessories used in the present invention may be selected from any one or more of a front surface mirror, plastic mirror, metal mirror, dichroic glass, prism, spectrum, mirrors, colored glass, glass ball, dry flower, papers, sands, oils with different density, miniature stuff, plastic pieces, color pieces, transparent pieces, translucent pieces, colorful pieces, or any small pieces objects that can fit into the space for an inner-medium, including kaleidoscope parts and accessories described in the above-cited copending or prior applications of the inventor. The kaleidoscope parts and accessories form a display-unit through which LED light beams pass to a projection means that enlarges and projects and image to any desired surface.

The preferred kaleidoscope construction may be selected from (a) a three mirror system, (b) a two mirror system, (c) a four mirror system (d) a tapered mirror system (e) a circular mirror system, or (5) any other construction that provides a desired mirror number and adjacent connecting angle for certain changeable patterns.

The LED light means for projecting the kaleidoscope means' image to a desired surface may powered by a plug-in outlet to provide continuous power to turn on the inner super bright LED(s). It will also be appreciated that power may alternatively be supplied by conventional batteries, or an adaptor, transformer, generator, chemical power, rechargeable batteries, or any other power source available from the marketplace.

The preferred LED light means uses super bright or high power LEDs which can offer sufficient brightness to incorporate with the inventor's projection means, as described in the inventor's copending or earlier filed cases.

The current invention provides a projected image that is bigger than the display-unit by up to a hundred times and that can be projected anywhere, as desired.

The invention may incorporate features from any of the following published or issued U.S. patent applications of the inventor: Ser. No. 12/948,953, 12/938,564, 12/886,832, 12-876,507, 12/771,003, 12/624,621, 12/914,584, 12/318,471, 12/318,470, 12-834,435, 12/292,153 (now U.S. Pat. No. 7,871,192), Ser. No. 12,232,505 (now U.S. Pat. No. 7,832,917), and Ser. No. 12/318,473 (now U.S. Pat. No. 7,832,918), each of which is incorporated by reference herein.

SUMMARY OF THE INVENTION

According to preferred embodiments, the invention may include the following combinations and/or features:

(1) at least one LED arranged as a light source to supply visible light beams;

at least one optics means for projecting a kaleidoscope-means image on a desired surface, the optics means selected from the group consisting of an optics lens, a convex or concave lens, a lens assembly, telescope means, a film, a display-unit, a transparent material, and a translucent material, laser created means, lenticular means, a grating film, hologram means, Lcos means, digital data means, screen-means, and display-means, the image being formed by light from the at least one LED passing through transparent areas, openings, cut outs, grading means, hologram means, laser created means, lenticular means, grating film, hologram means, Lcos means, digital data means, screen-means, display-means, kaleidoscope-means, kaleidoscope parts and accessories, and projection means in the LED device, the image being selected from the group consisting of a message, data, a logo, time, art, a geometric shape(s), and any other image desired to be projected on the desired surface, the desired surface including any one of a ceiling, a wall, a floor, and any other surface; and at least one power source, circuit means, control means, changing means and trigger means arranged to cause the at least one LED to exhibit desired light functions, timing, colors, brightness, illumination, images, and a kaleidoscope-means's variety of images, wherein:

the LED light is arranged to be plugged into an electric outlet or powered by a direct current source such as batteries, rechargeable batteries, an AC adaptor with a jack, transformers, a solar power source, a chemical power source, a generator, and any other direct current power source.

(2) an LED light device as described above that further utilizes an interchangeable power source concept, including:

at least one housing member having a uniform compartment arrangement to interchangeably receive different power source units;

the different power source units that the compartment is arranged to interchangeably receive including;

at least one alternating current (AC) powered LED sealed unit that by itself meets all safety standards and requirements for certification by a safety agency, and that fits within the compartment; and at least one direct current (DC) powered LED battery pack that fits within the compartment, wherein the AC power sealed unit and the DC powered battery pack include;

at least one LED that serves as a light source for visible light beams; and parts selected from the group consisting of circuit means, trigger means, sensor means, timer means, IC means, prong means, battery rechargeable means, an AC adaptor, DC storage means, battery means, switch means, solar means, generator means, chemical energy means, PCB means, conductive means, attachment means, clip means, twist tightening means, screw means, quick connect means, and rechargeable DC storage means, wherein the at least one LED is triggered when an electric signal output by the sealed unit or battery pack is applied to terminals of the at least one LED and thereby causes the at least one LED to emit light, and wherein the AC powered LED sealed unit and DC powered LED battery pack are arranged to be interchangeably fit into the uniform compartment of the LED light device to cause the LED device to become a finished product with properties determined by properties of the sealed unit or battery pack, the properties including geometric shape, purpose, function, application, features, and predetermined lighting effects including timing, duration, brightness, or colors.

BRIEF DESCRIPTION OF THE DRAWINGS

FIG. 1 shows a preferred embodiment of an LED device having a changeable projection image that uses a kaleidoscope means and miniatures means in which the positions, locations, and relationships of miniatures is changeable by manual or automatic control means that select a variety of the miniatures in different storage rooms on a gear-assembly wheel. The gear-assembly wheel is connected to inner motor-means, a moving device, vibration means, or other same-function or equivalent devices known from the marketplace. The projection means incorporates optics means, the kaleidoscope means, the miniatures means, control means, circuit means, LED(s), IC means, and power means to project splendid and colorful kaleidoscopic patterns to any desired surface for viewing.

FIG. 2A details of the construction of the LED device of FIG. 1, including the projection means, optics means, kaleidoscope means, and various miniatures means arrangements.

FIG. 2B shows a miniatures means with a plurality of storage rooms having more than one miniature in one device, as distinguished from the traditional kaleidoscope unit, which only has one of the miniatures for one unit.

FIGS. 3 to 11 show details of the construction of a variety of kaleidoscope units, each having colorful patterns presented through optics theories, including constructions with 2 mirrors, 3 mirrors, 4 mirrors or any desired number of mirrors at different angles to form desired color patterns as display-units and allow the projection assembly including projection means and optics means, and LED related parts and accessories, to project the kaleidoscope's splendid colorful patterns on desired surfaces including walls or a ceiling, floor, outdoor surface, object surface, or any other surface(s).

FIGS. 12A, 12B, 12C illustrate interchangeable power sources that can be used in the LED device having changeable patterns, including an AC power source in the form of a sealed-unit and a DC power source in the form of a battery-pack that can be used at any time, including when AC power is not available.

DETAILED DESCRIPTION OF THE PREFERRED EMBODIMENTS

FIG. 1 shows a preferred embodiment of an LED device (1) having a changeable projection image (1g) which has kaleidoscope means (shown in more detail in FIG. 2A) and miniatures means (1d) (1d1) (1d2) (1d3) (1d4) (FIG. 2A, 1-1, 1-6a, 1-6b), the position, location, and relative relations of which can be changed by manual or automatic control means such as gear-means (1c) to display a variety of different miniatures arranged in different storage compartments or rooms (FIG. 2B, 1-11, 1-11' 1-11") on a gear-assembly wheel (1-c). The gear-assembly wheel (1-c) or other vibration means (FIG. 2A, 1-6C), spin-means (not shown), or motion means (not shown) are connected with inner motor-means (not shown) or a moving device (not shown), or other same-function, equivalent actuating device available in the marketplace. A projection means (FIG. 2A, 1-1, 1-2, 1-3, 1-4, 1-7, 1-8) incorporates optics means (1-5, 1-7, 1-7a), the kaleidoscope means, the miniatures means (1d) (1d1) (d2) (1d3) (1d4) (FIG. 2A, 1-6, 1-6a, 1-6b), control means (1-c) (FIG. 2A, 1-6c), circuit means, an LED(s), IC means, and power means to project splendid, colorful, and changeable kaleidoscopic patterns to any desired surface using a super bright LED(s). The projection means can be the same as disclosed in the inventor's copending or prior publications and patents as listed above to project the image to desired locations for viewing.

FIG. 1 shows a very special plurality of miniature rooms or compartments, a variety of different miniatures being arranged in the different storage rooms to enable the different miniature(s) to be changed and get more colorful patterns from one single LED device.

FIG. 1 also shows prongs 1a for connecting the LED device to an AC power source. However, it will be appreciated that the device also can use a DC power source such as batteries, rechargeable batteries, an adaptor with a jacket, a transformer, and a generator, or solar power, wind power, water-power, chemical power, or any other power source capable of providing power to the device.

Furthermore, the LED device may be incorporated with another light source to provide more than one light means and enable the LED device to have more than one light performance.

The said LED device also may have different additional functions selected from functions of a consumer electronic device, communication device, optics device, or computer related device.

FIG. 2A shows details of a projection means (1-1) (1-2) (1-3) (1-4) (1-7b) (1-8) that may be used in the embodiment of FIG. 1, as well as optics means (1-5) (1-7) (1-7a), kaleidoscope means, and miniatures means (1-6) (1-6a) (1-6b) having different arrangements. It will be appreciated, however, that the invention is not limited to the arrangement shown in FIG. 2A, and that variations having a same or equivalent function, same effects, or replaceable parts may be substituted while still enabling colorful kaleidoscope patterns to be projected to any surface(s).

FIG. 2B shows details of the miniature means (1d, 1d1, 1d2, 1d3, 1d4) of FIG. 1, including a plurality of storage rooms or compartments (1-11) (1-11') (1-11") to enable more than one miniature or arrangement of miniatures to be included in one device. The traditional kaleidoscope unit only has one of the miniatures for one unit. FIG. 2B also shows gear means which can be manually adjusted to change or rearrange the inner miniatures and provide a variety of colorful, splendid spectra for projection to a desired surface. The gear means (1-10) or bumper means (FIG. 2A, 1-6c) also can be incorporated with motor means such as a toy car's motor (not shown), vibration means (not shown), spin means such as a clock movement device (not shown), and/or with a timer, sensor, remote control, motion sensor control, PIR sensor control, music sensor controller, noise controller or any other electric or mechanical controller available from the market to cause the inner miniatures to change relations, including any combination of position, location, orientation, height, attitude or any other relative relation between miniatures inside one of the rooms.

FIGS. 3 to 11 show detailed constructions of a variety of the kaleidoscope units, each having colorful patterns for presentation in accordance with optics theories. The preferred construction of the kaleidoscope may have 2 mirrors, 3 mirrors, 4 mirrors or any desired number of mirrors at different angles to each other to get the desired color patterns and provide display-units to provide images for projection by the projection assembly, the projection assembly including projection means, optics means, LED(s), and related parts and accessories to project the splendid, colorful kaleidoscope patterns on a desired surface(s) such as a wall, ceiling, floor, outdoor surface, object surface, or any other desired surface(s)

FIGS. 3, 4, and 5 show a 3 mirror arrangement and the colorful splendid spectrum created thereby.

As shown in FIG. 3, the 3 mirror arrangement has 3 equal sides and each side has a 60 degree angle to form a triangle arrangement inside the kaleidoscope to create the colorful, splendid spectrum shown in the drawing. How the splendid, colorful spectrum is viewed depends on the material of the miniatures put into the storage room(s), which may be selected from colorful pieces of paper, plastic pieces, balls, dry flowers, metal pieces, solid pieces, copper pieces, cotton pieces, liquids, gels or any objects available on the market.

As shown in FIG. 4, the 3 mirrors have one 90 degree angle to form a right triangle. The right triangle may be big or small or any size, and is arranged inside a tubular housing. The colorful, splendid patterns will be as illustrated. Again, the appearance of the splendid, colorful spectrum will depend on the material of the miniatures put into the storage room(s), which may selected from colorful pieces of paper, plastic pieces, ball(s), dry flowers, metal pieces, solid pieces, copper pieces, cotton pieces, liquids, gels or any objects available on the market.

As shown in FIG. 5, the 3 mirrors have two equal sides at a desired angle to form an isosceles triangle. The isosceles triangle may be big or small or any size, and is arranged inside a tubular housing to form the illustrated colorful, splendid patterns. The appearance of the splendid, colorful spectrum will depend on the material of the miniatures put into the storage room(s), which may again be selected from colorful pieces of papers, plastic pieces, balls, dry flowers, metal pieces, solid pieces, copper pieces, cotton pieces, liquids, gels, or any objects available from the market.

FIGS. 6-8 show 2 mirror arrangements in which a third surface is not a mirror means. FIG. 6 shows 2 mirrors arranged at 22.5 degree angles to form 360/22.5=16 images.

FIG. 7 shows 2 mirrors arranged at 30 degrees to form 360/30=12 images. FIG. 8 shows 2 mirrors arranged at a 60 degree angle to form 360/60=6 images of a colorful, splendid spectra in accordance with physics theory.

FIG. 9 shows a 4 mirror arrangement that creates a splendid, colorful, and very pretty spectrum.

FIG. 10 shows a corn arrangement for 3 mirrors that can create a pretty colorful spectrum.

FIG. 11 shows mirrors arranged in a square arrangement to provide a colorful spectrum.

FIGS. 12A, 12B, and 12C show interchangeable power sources that may be used in the LED device having changeable patterns, as disclosed in the inventor's U.S. Pat. Publ. No. 2007/0076439, including a sealed-unit for connection to an AC power source and a DC power source in the form of a DC power battery-pack that can be interchanged with the AC sealed-unit and used at any time.

The current invention thus can provide an LED device with built-in miniatures means and kaleidoscope means that provide colorful, splendid spectra for projection to any desired surface, and in which the LED(s) may be powered by interchangeable power sources for extra versatility.

The invention claimed is:

1. An LED device having a kaleidoscope image, comprising:
   an LED device housing;
   at least one LED arranged in said housing as a light source to supply visible light beams;
   kaleidoscope means arranged in said housing for forming a kaleidoscopic image,
      wherein the kaleidoscope means includes a plurality of reflective elements for providing multiple reflections of miniatures or display elements,
      wherein the miniatures or display elements include at least one of glass, prisms, colored glass, glass ball, dried flower pieces, papers, sands, oils with different density, miniature stuff, plastic pieces, colored pieces, transparent pieces, translucent pieces, colorful pieces, and small objects that fit into a space or an inner medium, and
      wherein said reflective elements are arranged in one of the following configurations: (a) a configuration with three mirror elements; (b) a configuration with two mirror elements; (c) a configuration with four mirror elements; (d) a configuration with a tapered mirror element; (e) a configuration with a circular mirror element; and (f) a configuration with a predetermined number of mirrors and mirror-connecting angles selected to create desired kaleidoscope patterns;
   at least one projection means for projecting the kaleidoscopic image onto a desired surface, wherein said projection means includes optics means, and wherein said optics means includes at least one of an optics lens, a convex lens, or concave lens, a or lens assembly, and a tubular element in which said at least one optics lens, convex lens, concave lens, or lens assembly is arranged, wherein said image is formed by LED light passing through said miniatures or display units, said kaleidoscope means and said projection means, said kaleidoscope image being selected from the group including a message, data, a logo, a time, arts, geometric shape(s) and any other image desired to be projected on said desired surface, and said desired surface selected from the group consisting of a ceiling, a wall, a floor, and any other surface; and
   a power source and at least one means arranged in said housing to cause said at least one LED to emit light having desired functions or characteristics,
      wherein the power source includes prongs that are not connected to the LED device by a power cord but rather extend directly from said housing of the LED device and are arranged to be plugged into an electric outlet.

2. An LED kaleidoscopic image light device having an interchangeable power source, comprising:
   at least one housing member;
   kaleidoscope means arranged in said at least one housing member for forming a kaleidoscopic image;
   image projecting means for projecting the kaleidoscopic image onto a surface;
   said at least one housing member having a uniform compartment arranged to selectively receive a plurality of different power source units, said different power source units received by said uniform compartment including both an AC powered sealed unit and a DC powered LED battery pack,
   wherein the AC powered sealed unit and the DC powered battery pack each includes at least one LED that serves as a light source; and electrical parts incorporated with the at least one LED for triggering said at least one LED, said parts selected from the group consisting of any combination of a trigger circuit, sensor, timer, IC, prong, recharging circuit, AC adaptor, DC storage element, battery, switch, solar unit, generator, chemical energy source, printed circuit board, conductor, attachment means, clip, twist tight means, screw, quick connector, and rechargeable DC storage means, wherein the LED is triggered when the electrical parts supply a trigger signal to terminals of the LED and cause the LED to emit light in a desired direction, and wherein the AC powered sealed unit and DC powered battery pack are interchangeable to switch the LED light device from an AC powered LED light device to a DC powered LED light device and from a DC power LED light device to an AC powered LED light device.

3. An LED device having a kaleidoscopic image, comprising:
(a) kaleidoscopic means arranged in an LED device housing for forming a kaleidoscopic image when light passes through a medium containing miniatures or display elements;
(b) an LED light means arranged in the LED device housing for emitting light beams that pass through the kaleidoscopic image forming means;
(c) a changing device for causing media or display elements in the kaleidoscopic means to change position, orientation, and relationships in order to vary the kaleidoscopic image, said changing device including one of a manually rotated wheel for moving different sets of said miniatures or display elements in front of said LED and a vibration device for vibrating said miniatures or a moving device for moving said display elements;
(d) control means in the LED device housing for controlling the changing device and light functions, brightness, color, and light effects of the LED light means;
(e) a projection assembly with an optics lens for projecting the kaleidoscopic image to a desired surface; and
(f) a power source to supply power to the LED device to cause the LED device to provide illumination.

4. The LED device claimed in claim 1, 2, or 3, wherein the kaleidoscope means comprises different miniatures situated in a plurality of storage compartments or different display elements each including a film or slide, said kaleidoscopic image being changed by moving said storage compartments with different miniatures or said different display elements to a kaleidoscopic image forming position at which different colorful and splendid kaleidoscopic patterns are created, and said miniatures being selected from, or said film or slide being selected to form images of, colorful pieces of paper, plastic pieces, balls, dry flowers, metal pieces, solid pieces, copper pieces, cotton pieces, liquids, gels, and other objects capable of forming kaleidoscopic patterns when illuminated.

* * * * *